United States Patent [19]

Yamaguchi

[11] Patent Number: 5,675,434
[45] Date of Patent: Oct. 7, 1997

[54] IMAGE PROJECTION APPARATUS AND PROJECTION SCREEN

[75] Inventor: Hiroshi Yamaguchi, Hirakata, Japan

[73] Assignee: Matsushita Electric Industrial Co., Ltd., Osaka, Japan

[21] Appl. No.: 380,350

[22] Filed: Jan. 27, 1995

[30] Foreign Application Priority Data

Jan. 28, 1994 [JP] Japan .................. 6-008255

[51] Int. Cl.$^6$ .................................................. G03B 21/60
[52] U.S. Cl. .......................... 359/457; 359/453; 359/460
[58] Field of Search ............................ 359/453, 456, 359/457, 455, 460

[56] References Cited

U.S. PATENT DOCUMENTS

| | | | |
|---|---|---|---|
| 4,852,981 | 8/1989 | Suda | 350/413 |
| 5,066,099 | 11/1991 | Yoshida et al. | 359/457 |
| 5,076,661 | 12/1991 | Bradley | 359/456 |
| 5,300,942 | 4/1994 | Dolgoff | 345/32 |
| 5,400,114 | 3/1995 | Yoshida et al. | 359/457 |

*Primary Examiner*—Daniel P. Malley
*Attorney, Agent, or Firm*—Ratner & Prestia

[57] ABSTRACT

An image projection apparatus of a rear projection type according to the present invention includes: a display portion having three image sources respectively displaying red, green, and blue images; a screen portion on which the red, green, and blue images are projected; and a projection member positioned between the display portion and the screen portion. The screen portion includes an optical member converting a plurality of light beams output from the display portion into a plurality of substantially collimated light beams, and a rear face and a front face provided at a predetermined interval. The rear face is positioned between the front face and the optical member, the rear face and the front face respectively having an array of cylindrical lenses, the optical axial plane of each cylindrical lens on the front screen face substantially coinciding with the optical axial plane of a corresponding cylindrical lens on the rear screen face. Each cylindrical lens on the front face outputs a light beam which is incident on the corresponding lens on the rear face obliquely to the optical axial plane at the same angle as that of a light beam which is incident on the plane parallel to the optical axial plane, on both sides of the optical axial plane.

14 Claims, 10 Drawing Sheets

IMAGE PROJECTION APPARATUS AND PROJECTION SCREEN

BACKGROUND OF THE INVENTION

1. Field of the Invention

The present invention relates to an image projection apparatus in which three primary color images formed by image sources, such as cathode ray tubes (CRTs) and liquid crystal panels, are enlarged to be projected on the rear face of a screen and overlapped with each other thereon, and the resulting color image is observed from the front face of the screen. In particular, the present invention relates to a projection screen capable of substantially eliminating a color shift involved in this type of apparatus.

2. Description of the Related Art

In recent years, there has been a brisk demand for a large display mainly in a TV receiver. Under such circumstances, an image projection apparatus of a back projection type, which enables a large display in a light-weight and compact structure has drawn attention. In this type of apparatus, generally, images formed by image sources each producing a different primary color image, i.e., a red image, a blue image, and a green image, are enlarged to be projected on a screen by projection lenses respectively corresponding to the primary color images and are combined with each other thereon to form a full-color image. FIG. 1 schematically shows a basic structure for an image projection apparatus of a rear projection type.

The apparatus shown in FIG. 1 uses CRTs as monochrome image sources. A CRT 1R, a CRT 1G, and a CRT 1B display a red image, a green image, and a blue image, respectively. The displayed red, green and blue images are enlarged to be projected on a screen 3 by projection lenses 2R, 2G, end 2B. The screen 3 has a Fresnel-lens 3a and a lenticular screen 3b. The Fresnel lens 3a converts projected light beams, which diverge from the projection lenses 2R, 2G, and 2B and incident on the screen 3, into substantially collimated light beams. The lenticular screen 3b is provided with an array of cylindrical lenses on both of the rear face (i.e., face on which images are projected) and a front face (i.e., face from which the resulting full-color image is observed). This allows the lenticular screen 3b to diffuse incident light beams. An observation angle characteristic of the image projection apparatus is determined by the diffusion of incident lights by the lenticular screen 3b.

In the image projection apparatus with the above-mentioned structure, incident angles of the projected light beams with respect to the screen 3 are different between the red, green, and blue light beams (the difference in incident angle is referred to as a converging angle). This causes a color shift, which should be eliminated for controlling the observation angle characteristic of the image projection apparatus.

An example of a method for reducing the color shift is described in U.S. Pat. No. 4,432,010 (which corresponds to Japanese Laid-Open Patent Publication No. 58-134627). According to U.S. Pat. No. 4,432,010, it is proposed that each lens on an incident face (i.e., the rear face) of the lenticular screen 3b is prescribed to be an ellipsoidal shape, in which eccentricity is equal to a reciprocal of the medium refractive index, to eliminate spherical aberration, and an outgoing face (i.e., the front face) is located at a position where a focal line of each lens on the incident face is present. By setting the shape of each lens on the incident face and the position of the outgoing face, green light beams which enter a lens on the incident face so as to be in parallel with an optical axial plane of the lens on the incident face are completely converged. Thus the angle at which the green light beams are output from the lenticular screen 3b does not depend upon the profile of the outgoing face. In this specification, it is noted that "optical axial plane" means a plane including the optical axis of a cylindrical lens on the incident face and which is in parallel with the extended direction of the cylindrical lens.

On the other hand, each cylindrical lens on the incident face causes coma aberration with respect to blue light beams and red light beams which are incident on the incident face so as to be oblique to the optical axial plane of the lens thereon. Therefore, the profile of the outgoing face is designed so that the outgoing angles of the blue and red light beams are corrected by using coma aberration. Accordingly, a color shift can be reduced by setting the shape of the respective lenses on the incident face and the outgoing face and setting the position of the outgoing face.

FIG. 2 is a graph showing the relationship between an observation angle and the relative brightness of the screen 3 designed by using the above method. Here, it is noted that the converging angle is 7°, a medium refractive index (about 1.5) of polymethyl methacrylate (PMMA) which is most commonly used as a screen material is used, and the effect of a randomly granular diffuser generally involved are not considered. In this figure, a horizontal axis represents an observation angle, i.e., an angle at which the screen 3 is observed, where the right angle with respect to the screen 3 is prescribed to be 0. A vertical axis represents relative brightness, where brightness is prescribed to be 100 at a time when the observation angle is 0°. As is understood from FIG. 2, the range of the observation angle of the green light beams is set to be about ±50°. This is a standard value required for the currently used image projection apparatus. It should be noted that the range of the observation angle of the green light beams is set to be ±50° in the other examples in this specification.

As shown in FIG. 2, there is a slight difference between the ranges of the observation angle of the red, blue, and green light beams. However, such difference can be compensated by adding diffuser, whereby characteristics of the image projection apparatus sufficient for practical use can be realized.

As described above, in the case where the converging angle is small, a color shift can be reduced by using the conventional method to an extent sufficient for practical use. However, in recent years, there has been a great demand for a thin apparatus. In order to meet this demand, the increase in converging angle cannot be avoided. Thus, it is pointed out that the conventional method is insufficient for reducing a color shift under such circumstances.

FIG. 3 shows the relationship between the observation angle and the relative brightness of the screen 3 designed by using the above-mentioned conventional method, where the converging angle is 15°.

As is understood from FIG. 3, the ranges of the observation angle of the red, blue, and green light beams are greatly different. Furthermore, brightness in the respective light beams is distributed in a wide range and a great color shift is caused depending upon the observation angle.

The inventors of the present invention have found the reason why a color shift cannot be sufficiently eliminated by the conventional method at a time when the converging angle is large. More specifically, the inventors have found that the insufficient correction of a color shift is attributed to the fact that each lens on the incident face of the lenticular screen 3b is prescribed to be an ellipsoidal shape, in which eccentricity is equal to a reciprocal of a medium refractive index.

In the conventional method, the cylindrical lenses on the incident face of the lenticular screen 3b are designed as described above. The profile of the outgoing face is designed so that the outgoing angles of the red or blue light beams, which are incident on the incident face so as to be oblique to the optical axial planes of the lenses thereon, is equal to the outgoing angle of the green light beams having the same incident height as the red or blue light beams. More specifically, an outgoing height of obliquely incident light beams and the slope of the outgoing face required for correcting the outgoing angles of the light beams are obtained by using an approximated equation with respect to some incident heights, and the profile of the outgoing face is described as the relationship between the position from the optical axis face and the differential. The profile of the outgoing face is obtained from this relationship.

In the approximation used in the conventional method, it is assumed that all light beams whose absolute value of incident heights are equal, are equal in both the outgoing heights and the slopes of the outgoing face required for correcting an outgoing angle. Although this approximation can be applied to the case where the converging angle is small, it causes a large error when the converging angle becomes large.

Now, the ray tracing of a light beam without using the approximation will be described below. Such a ray tracing reveals that a large error is caused in the conventional apparatus when the converging angle is large. It is assumed that the incident face and the outgoing face are respectively designed so as to be symmetric with respect to the optical axial plane, considering the symmetry of the image projection apparatus. Here, only the ray tracing of a blue light beam, which is incident on the incident face so as to be oblique to the optical axial plane, is performed.

The specific procedure will be described with reference to FIG. 4.

FIG. 4 shows a profile of one cylindrical lens on the incident face when the lens is cut along a plane perpendicular to the extended direction of the lens. Each lens on the incident face is designed in accordance with the conventional method. Assuming that the optical axis of the lens is an x-axis and a normal of the optical axial plane of the lens is a y-axis, the profile of the lens on the incident face can be represented by the following Formula (1):

$$x^2 + y^2/b^2 = K^2 \quad (1)$$

$$b^2 = 1 - (1/n)^2$$

where n is a medium refractive index (refractive index of 1.5 of PMMA is used here); and K is a scaling factor. (hereinafter, 1 will be used). Thus, the coordinate of a vertex is (−1, 0) as shown in FIG. 4.

By setting as described above, the light beams which exist in a plane parallel to a paper plane and enter the lens on the incident face parallel to the optical axis are converged at one point without causing spherical aberration and its converged coordinate becomes (1/n, 0). Thus, a plane whose x-coordinate is 1/n is set to be the outgoing face.

It is assumed that the incident height of a center light beam of luminous fluxes is 0 and the incident height h is defined as shown in FIG. 4.

1) One incident height h (here, −0.54) is selected, and the ray tracing of a green light beam having the selected incident height h is performed to obtain an outgoing angle $\theta_G$.

2) A blue light beam with the same incident height h is subjected to the ray tracing to obtain an outgoing height Y, and an outgoing angle $\theta'_B$.

3) An outgoing face slope dx/dy allowing the outgoing angle $\theta'_B$ of the blue light beam to be equal to the outgoing angle $\theta_G$ is obtained.

4) As the condition to be satisfied by the profile of the outgoing face, it is prescribed that the slope of the outgoing face in the outgoing height $y_B$ is equal to dx/dy.

5) The above-mentioned procedures are conducted with respect to some incident heights. In this way, the conditions for determining the profile of the outgoing face which can correct a color shift are obtained as dot-sequential data of the position and the differential.

FIG. 5 shows an example of dot-sequential data obtained in the case where the converging angle is 15°. In FIG. 5, a horizontal axis represents the outgoing height $y_B$ of the blue light beam, and the vertical axis represents the outgoing face slope dx/dy required for the outgoing angle of a certain blue light beam to be equal to that of a green light beam having the same incident height as that of the certain blue light beam. FIG. 5 shows data of a light beam incident on the incident face from an upper region of the optical axial plane (hereinafter, referred to as an upper light beam) and data of a light beam incident on the incident face from a lower region of the optical axial plane (hereinafter, referred to as a lower light beam).

As is understood from FIG. 5, although absolute values of light beam heights are equal, the upper light beam is different from the lower light beam in outgoing height $y_B$ and in outgoing face slope dx/dy required for correcting the respective outgoing angles. This means that the conditions for correcting the outgoing angles are different from each other between the upper light beam and the lower light beam. More specifically, when the absolute value of the incident height h is small, or when the light beams are incident on the incident face in the vicinity of the optical axial plane, the outgoing height of the upper light beam is relatively higher than that of the lower light beam, and when the absolute value of the incident height h is large, the outgoing height of the lower light beam is relatively higher than that of the upper light beam. Such differences become large with the increase in the converging angle.

As long as the above-mentioned differences are caused, even though the profile of the outgoing face is varied, the upper light beam and the lower light beam cannot be simultaneously corrected. As a result, the correction of a color shift is not sufficiently made as shown in FIG. 3. Furthermore, such differences are imperative as long as each lens on the incident face is designed in an ellipsoidal shape in which spherical aberration is not caused.

SUMMARY OF THE INVENTION

The image projection apparatus of this invention of a rear projection type includes a display portion having three image sources respectively displaying red, green, and blue images, a screen portion on which the red, green, and blue images are projected, and a projection member positioned between the display portion and the screen portion. The screen portion includes: an optical member for converting a plurality of light beams output from the display portion into a plurality of substantially collimated light beams; and a rear face and a front face disposed at a predetermined interval, wherein the rear face is positioned between the front face and the optical member, the rear face and the front face respectively having an array of cylindrical lenses, an optical axial plane of each of the cylindrical lenses on the front face substantially coinciding with an optical axial plane of a corresponding cylindrical lens on the rear face, and wherein each of the cylindrical lenses on the front face outputs a light beam which is incident on the corresponding cylindrical lens on the rear face obliquely to the optical axial plane at a first angle, and outputs a light beam which is incident on the corresponding cylindrical lens on the rear face parallel to the optical axial plane at a second angle, the first angle and the second angle are substantially equal to each other on both sides of the optical axial plane and the other side of the optical axial plane.

According to another aspect of the invention, a projection screen includes: an optical member converting a plurality of light beams into substantially collimated light beams; and a rear face and a front face provided at a predetermined interval, wherein the rear face is positioned between the front face and the optical member, the rear face and the front face respectively having an array of cylindrical lenses, an optical axial plane of each of the cylindrical lenses on the front face substantially coinciding with an optical axial plane of a corresponding cylindrical lens on the rear face, and wherein each of the cylindrical lenses on the front face outputs a light beam which is incident on the corresponding cylindrical lens on the rear face obliquely to the optical axial plane at a first angle, and outputs a light beam which is incident on the corresponding cylindrical lens on the rear face parallel to the optical axial plane at a second angle, the first angle and the second angle being substantially equal to each other in both sides of the optical axial plane.

Thus, the invention described herein makes possible the advantage of providing an image projection apparatus and a projection screen capable of sufficiently correcting a color shift even though the converging angle is large.

This and other advantages of the present invention will become apparent to those skilled in the art upon reading and understanding the following detailed description with reference to the accompanying figures.

DESCRIPTION OF THE PREFERRED EMBODIMENTS

The concept of the present invention is that the profile of the outgoing face is prescribed so that the conditions to be satisfied by the outgoing face for correcting a color shift are identical with respect to both the upper light beams and the lower light beams. More specifically, the shape of an incident face is determined so that the conditions for correction of the upper light beams and those of the lower light beams are identical, and then the profile of the outgoing face is prescribed so as to satisfy the identical conditions for correction.

Figure 5:
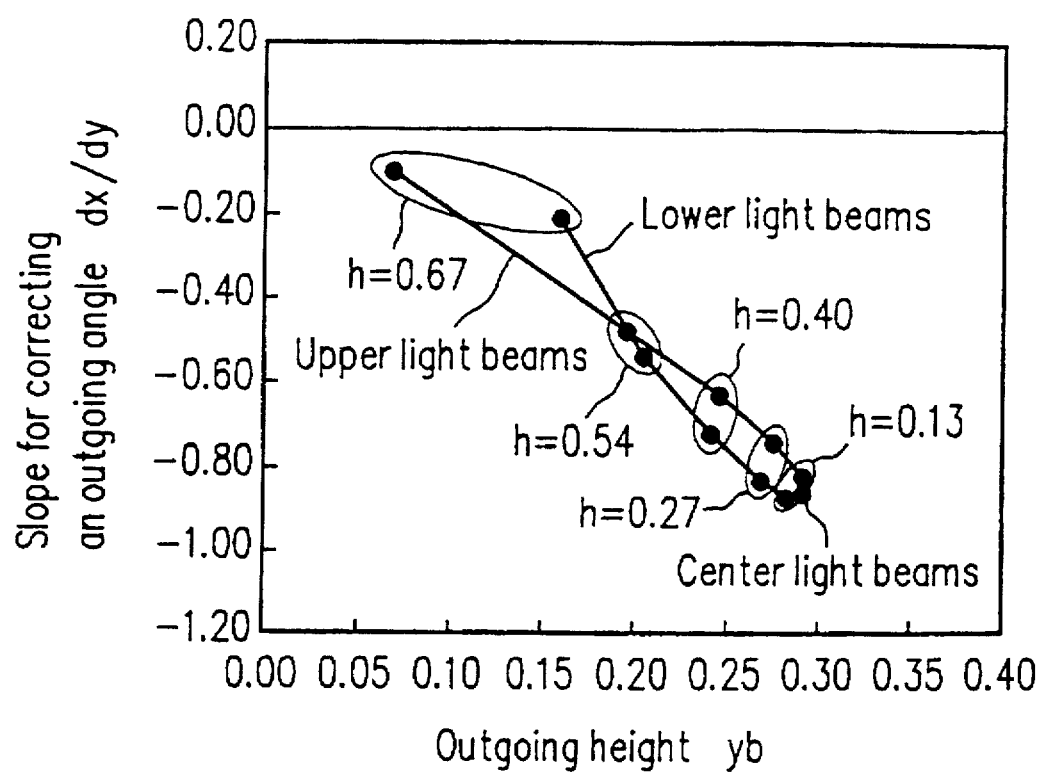
FIG. 5 is a graph showing the conditions of correcting a color shift in the case where the conventional method is applied to the image projection apparatus with a converging angle of 15°.

First of all, it will be considered what kind of corrections are required for eliminating the difference an conditions for correction between the upper light beams and the lower light beams as shown in FIG. 5 by using the conventional settings of the shape of the incident face and the interval between the incident face and the outgoing face.

For eliminating the difference in conditions for correction between the upper light beams and the lower light beams incident on the incident face in the vicinity of the optical axial planes, it is effective to increase the face interval. By doing so, the outgoing heights of the upper light beams become relatively low and those of the lower light beams become relatively high; as a result, such difference can be eliminated. On the contrary, for eliminating the difference in conditions for correction between the upper light beams and the lower light beams incident on regions of the incident face where absolute values of the incident heights are large, it is effective to decrease the face interval.

For eliminating both of the differences as described above, according to the present invention, the shape of each lens on the incident face are prescribed so that spherical aberration is caused in such a manner that the off-axis focal length of the lens is larger than the paraxial focal length thereof, and the outgoing face is located between the outermost off-axis focal point and the paraxial focal point.

Figure 6:
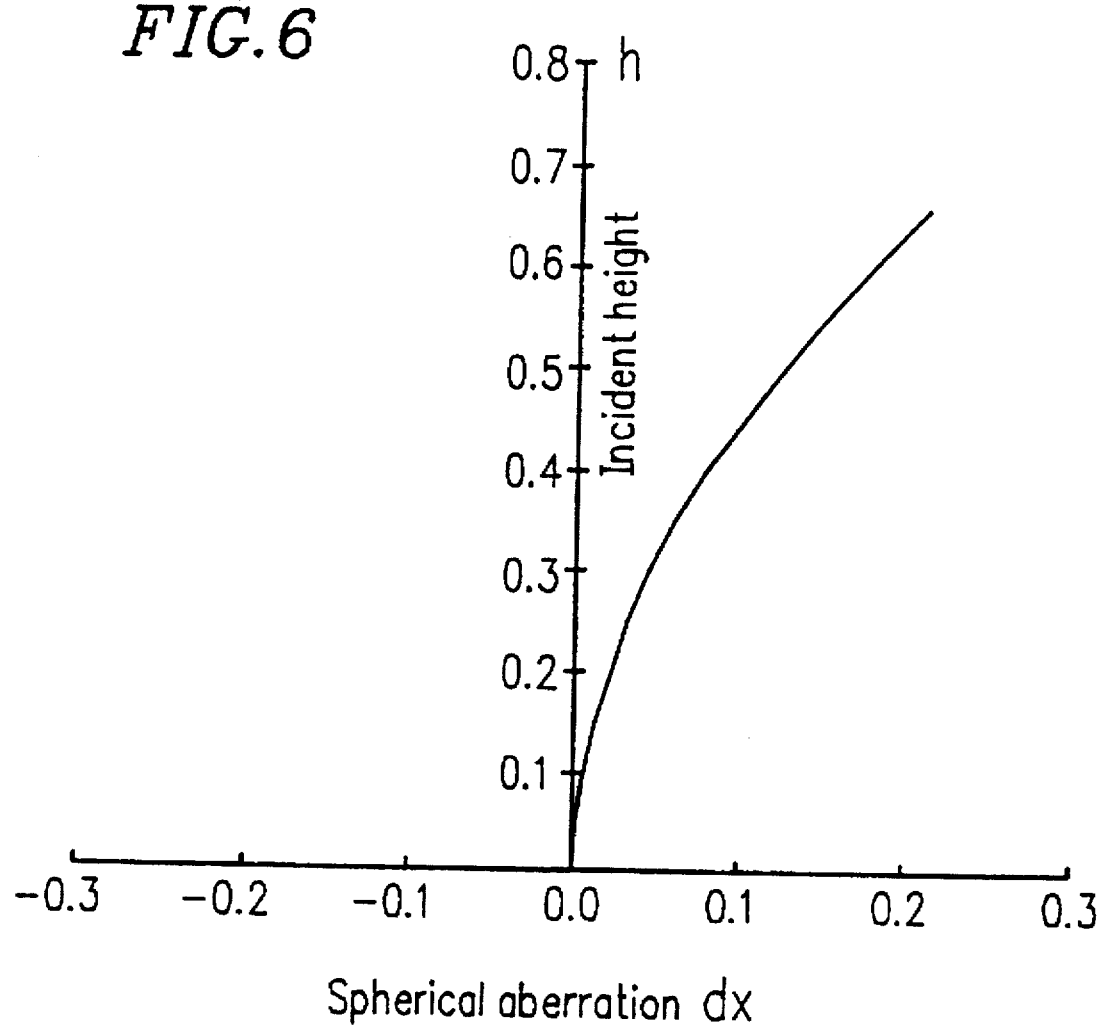
FIG. 6 is a graph showing the relationship between spherical aberration and the incident height in an example where the present invention is applied to the image projection apparatus with a converging angle of 15°.

Hereinafter, an example of the present invention in the case where the converging angle is 15° will be described with reference to FIGS. 6 through 8.

In the present example, the profile of each lens on the incident face is represented by the following Formula (2):

$$x = (1 - y^2/b^2)^{1/2} + C*y^2 \qquad 2)$$

$$b^2 = 1 - (1/n)^2 = 0.556$$

$$C = 0.125$$

In Formula (2), the first term of the right side represents the profile of each lens on the incident face similar to that of the conventional apparatus, and the second term thereof represents the characteristic portion of the present invention. The incident region of the light beams is set to be $|y| \leq 0.66$ so that the range of the observation angle falls in ±50°.

Because of the addition of the second term, i.e., $C*y^2$, spherical aberration is caused, which enables the outermost off-axis focal length to be larger than the paraxial focal length; that is, spherical aberration is caused, which is opposite to that generated in the case where the incident face is made to have a circular section. FIG. 6 shows spherical aberration in the case where the profile of the lenses on the incident face is represented by Formula (2).

When the profile of the lenses on the incident face is prescribed as above, the paraxial focal length becomes 1.46 and the outermost off-axis focal length of light beams having the incident height of |h|=0.66 becomes 1.68. Thus, in the present example, the interval between the incident face and the outgoing face is set to be 1.62. The x-coordinate of the vertex of the incident face is −1, so that the x-coordinate of the vertex of the outgoing face is 0.62.

Figure 4:
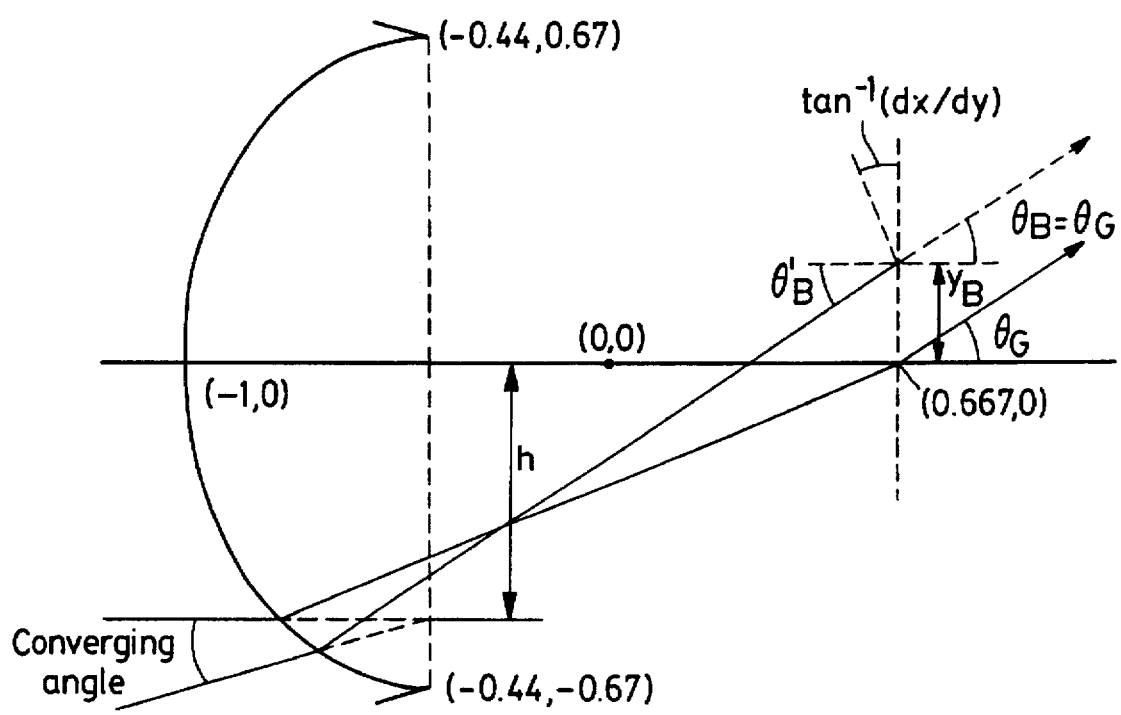
FIG. 4 is a view illustrating a procedure for obtaining conditions for correcting a color shift.

Under the above-mentioned setting, the slope of the outgoing face required for correcting a color shift is obtained y the procedure as described with reference to FIG. 4. FIG. 7 shows the relationship between the outgoing height and the slope of the outgoing face. This data is obtained with respect to a profile of an outgoing region of the blue light beams which are incident obliquely to the optical axial plane, assuming that the outgoing region of the green light beams is a plane parallel to the optical axial plane. Here, "an outgoing region of the light beams" refers to a region of the outgoing face from which the light beams are output.

Figure 7:
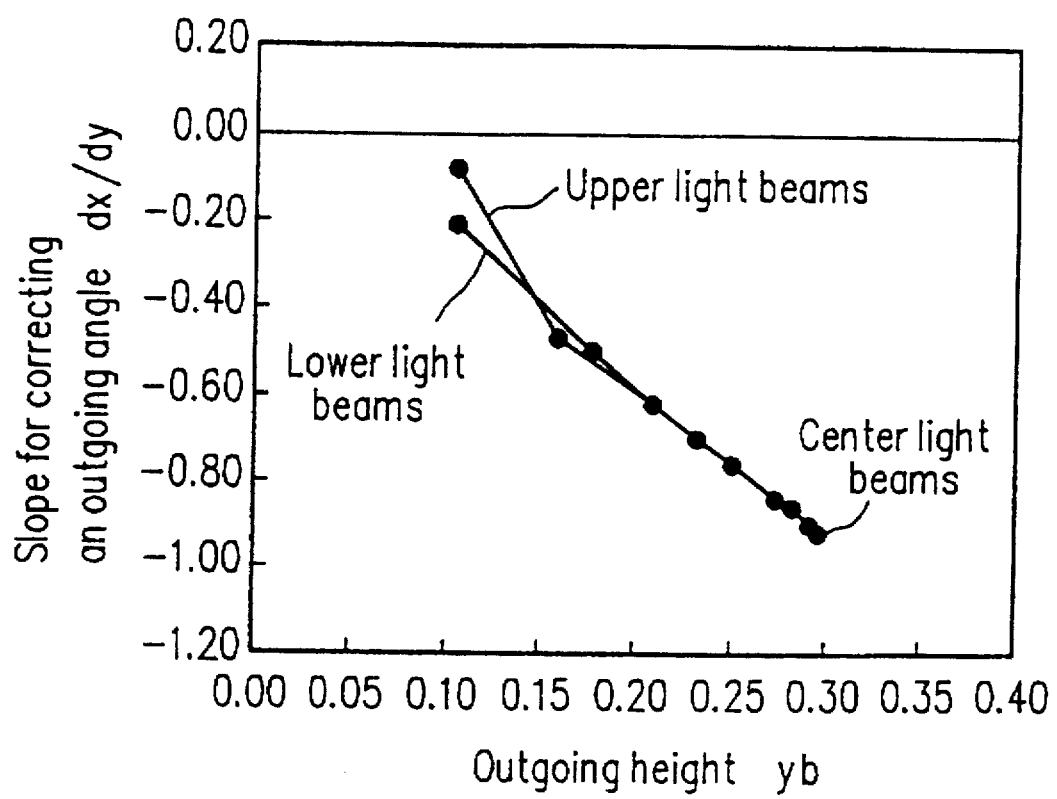
FIG. 7 is a graph showing the conditions for correcting a color shift in the example where the present invention is applied to the image projection apparatus with a converging angle of 15°.

As shown in FIG. 7, when the profile of the incident face is prescribed in accordance with Formula (2), and the face interval is set so that the outgoing face is positioned between the paraxial focal point and the outermost off-axis focal point, the conditions for correction of the upper light beams (i.e., relationship between the position and the differential) and the conditions for correction of the lower light beams can substantially completely coincide with each other. Furthermore, as is understood from FIG. 7, the outgoing region of the blue light beams is in the range of $0.108 \leq y \leq 0.201$. At this time, the outgoing region of the green light beams is $|y| \leq 0.041$.

Hereinafter, the setting of the profile of the outgoing face satisfying the conditions for correction thus obtained will be described.

First, assuming that the vicinity of the optical axial plane of the outgoing face of the green light beams, i.e., $|y| \leq 0.041$ is a plane ($dx/dy=0$, $x=0.62$) perpendicular to the x-axis as described above. Then, the outgoing region ($0.108 \leq y \leq 0.301$) of the blue light beams can be obtained by approximating the dot-sequential data with a function and integrating the result. In the present example, the dot-sequential data is approximated by the minimum square method, using the following Formula (3) of 0-order to 3-order:

$$dx/dy = A_0 + A_1 * y + A_2 * y^2 + A_3 * y^3 \quad (3)$$

$A_0 = 0.8528$ $A_1 = -13.15$ $A_2 = 41.82$ $A_3 = -59.19$

Formula (3) is integrated, $$X = D + A_0 * y + A_1/2 * y^2 A_2/3 * y^3 + A_3/4 * y^4 \quad (4)$$

The integral constant D depends upon the face interval and the profile of the regions other than the regions to which the function represented by Formula (3) is applied as an approximation equation. The integral constant D is set so that the profile of the outgoing face has continuity.

Light beams are not transmitted through the regions other than the outgoing regions of the green light beams and the blue (or red) light beams. Therefore, such regions can have any profile. Among them, the profile of the region between the outgoing regions of the green light beams and those of the blue (or red) light beams is prescribed to be flat until $y=0.085$ where $dx/dy=0$, while the profile of the region having $|y|>0.085$ is determined using Formula (3). By doing so, the profile of the outgoing face can be made smooth without any incontinuous slope. When D is set at 0.587 so that x becomes 0.62 when y is 0.085, the continuity of the shape of the outgoing face can be satisfied. Furthermore, regarding the outside regions of the outgoing regions of the blue light beams, it is effective to provide a light absorbing layer in terms of the enhancement of contrast. When the region satisfying $|y|>0.33$ is made a light absorbing layer, considering the margin, it is possible that 50% of the area of the outgoing face can be made a light absorbing layer.

The profiles of the incident face and the outgoing face can be represented by using the above-mentioned values with b, C, D, $A_0$ to $A_3$.

Figure 8:
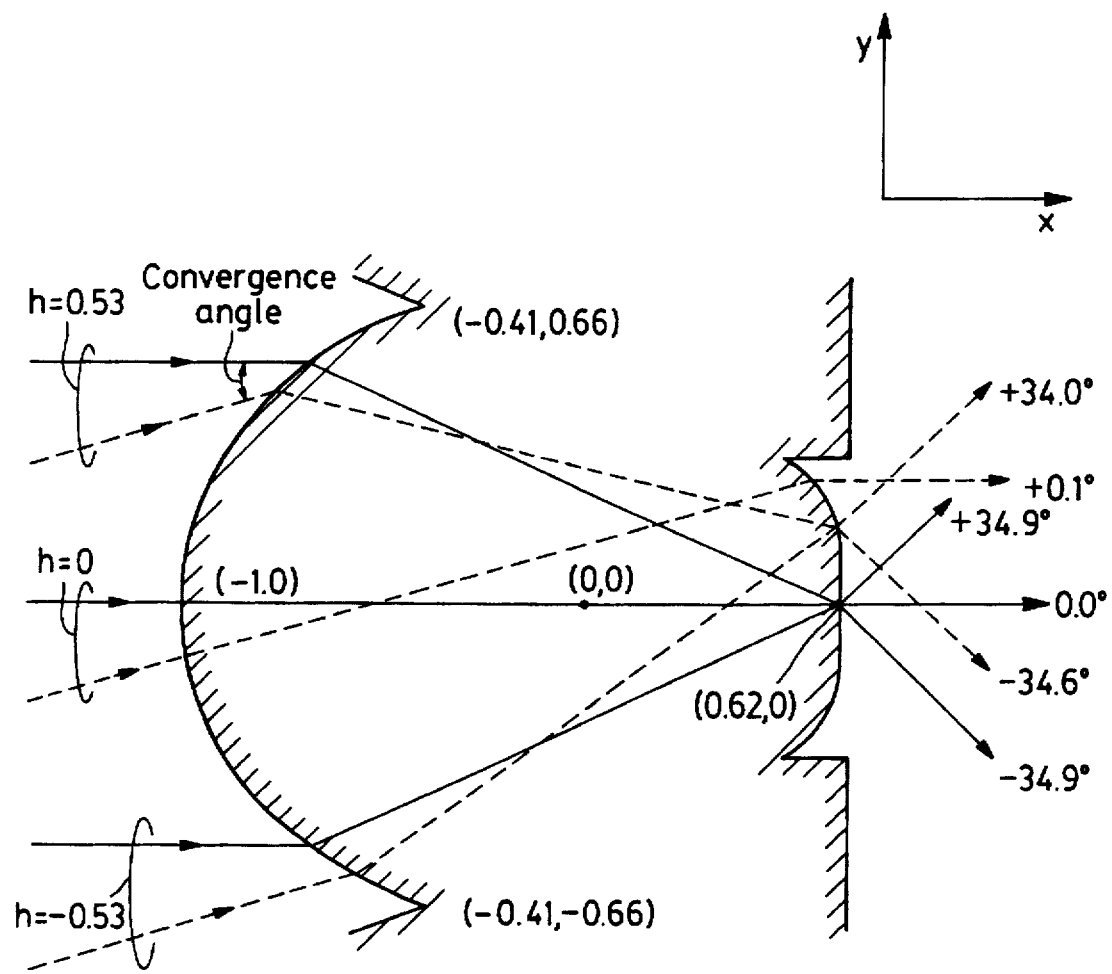
FIG. 8 shows the results of the ray tracing of a light beam in the example where the present invention is applied to the image projection apparatus with a converging angle of 15°.

(Incident face)
$x = -(1 - y^2/b^2)^{1/2} + C * y^2 \quad (|y| \leq 0.66)$ (Outgoing face)
$x = 0.62 \quad (|y| \leq 0.085)$ $x = D + A_0 * y + A_1/2 * y^2 + A_2/3 * y^3 + A_3/4 * y^4$
$\quad (0.085 < |y| \leq 0.33)$ Light absorbing layer $\quad (0.33 < |y| \leq 0.66)$ FIG. 8 shows the results of the ray tracing of light beams in the case where the incident face and the outgoing face having the above-mentioned profiles are used. In this figure, the light beams passing on the optical axial plane (h=0) and the light beams with a incident height of $h=\pm 0.53$ are subjected to the ray tracing, and the green light beams (second beam) are represented by a solid line and the blue light beams are (first beam) represented by a broken line. It is understood from FIG. 8 that the outgoing angle of the green light beams (second angle) and the blue light beams (first angle) having the same incident height are nearly equal to each other in both of the upper light beams and the lower light beams. Thus, by using the profiles of the incident face and the outgoing face, and the face interval of the present example, a color shift can be sufficiently corrected.

Figure 3:
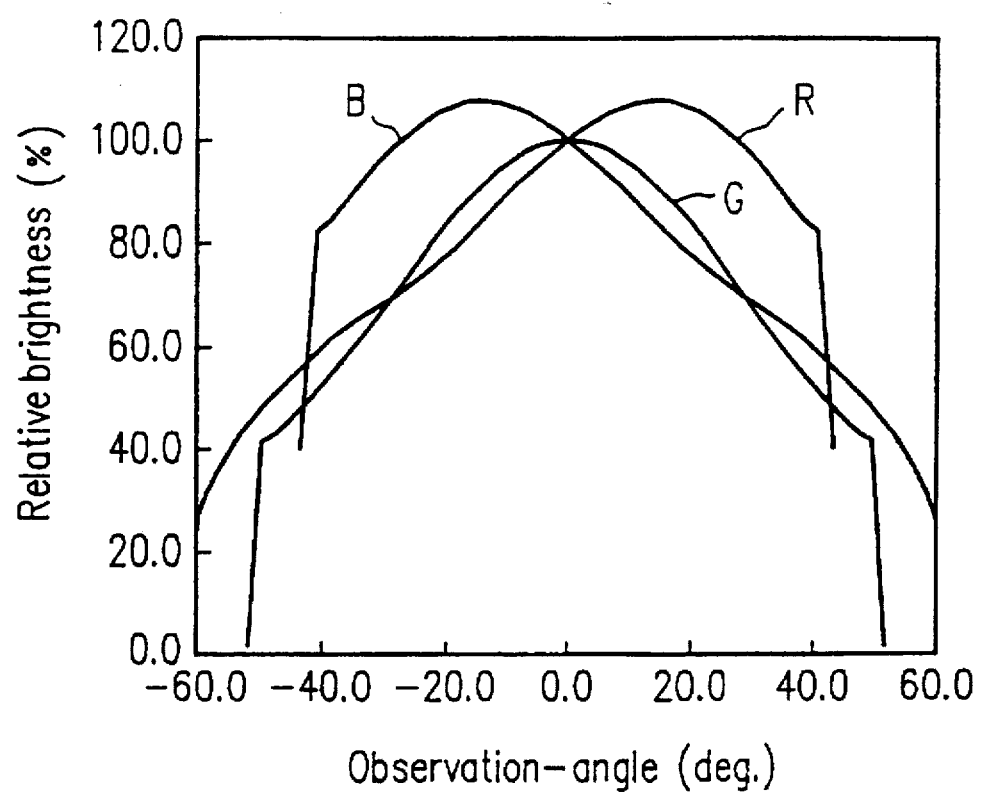
FIG. 3 is a graph showing the relationship between the observation angle and the relative brightness in the case where the conventional method is applied to the image projection apparatus with a converging angle of 15°.
Figure 9:
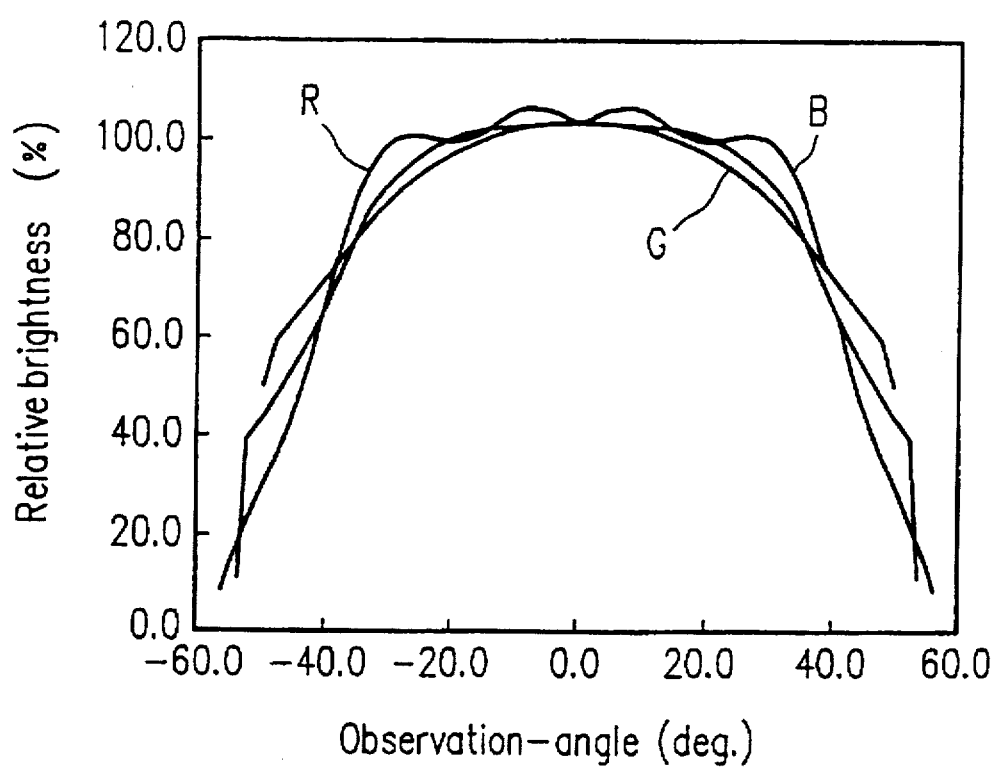
FIG. 9 is a graph showing the relationship between the observation angle and the relative brightness an the case where the present invention is applied to the image projection apparatus with a converging angle of 15°.

FIG. 9 shows the observation angle dependency of the relative brightness in the case where the profiles of the incident face and the outgoing face, and the face interval are set in accordance with the present example. Compared with the case of using the setting of the conventional apparatus as shown in FIG. 3, it is understood that a color shift is eliminated more sufficiently in the present example. Therefore, in accordance with the setting of the present example, performance sufficient for practical use can be realized even with respect to the converging angle of 15°.

In the present example, the outgoing regions of the green light beams are prescribed to be a plane which is perpendicular to the optical axial plane and is parallel with the extended direction of the lenses on the outgoing face, i.e., a plane perpendicular to the x-axis. However, the outgoing regions of the green light beams are not limited to such a plane. Even in the case where the outgoing regions of the green light beams are prescribed to have another profile, conditions for correcting a color shift are obtained based on the profile, and the profile of the entire outgoing face is prescribed so as to satisfy the obtained conditions, the same effects as those described above can be obtained.

The above-mentioned example has shown that a color shift is remarkably eliminated compared with the conventional apparatus, when the converging angle is a large value such as 15°. However, according to the present invention, even when the converging angle is a small value such as 7°, a color shift can be eliminated more efficiently than the conventional apparatus.

Hereinafter, as a modification of the above-mentioned example, an example of the setting of the profile of the incident face, the face intervals between the incident face and the outgoing face, and the profile of the outgoing face in the case of the converging angle of 7° will be described.

In this modified example, the profile of the incident face is prescribed as represented by the following Formula (5):

$$x=-(1-y^2 b^2)^{1/2}+C'*y^2 \qquad (5)$$

$C'=0.02$

In this modified example, the incident region are set as $|y| \leq 0.66$ so that the range of the observation angle becomes $\pm 50°$.

The face interval between the incident face and the outgoing face is set to be 1.66. The x-coordinate of the vertex of the incident face is $-1$, so that the x-coordinate of the vertex of the outgoing face is 0.66.

Then, the conditions for correcting a color shift are obtained in the same procedure as that of the above-mentioned example, and the profile of the outgoing face is prescribed so as to satisfy the conditions. In this case, it is also intended that the profile of the outgoing region of the green light beams is a plane perpendicular to the x-axis. The outgoing region of the green light beams is $|y| \leq 0.041$. The outgoing regions of the blue light beams is $0.041 < |y| \leq 0.33$. The profile of the outgoing face can be represented by the following Formulae (6) and (7):

$$x = 0.66 \quad (|y| \leq 0.041) \qquad (6)$$

$$x = D' + A'_0 * y + A'_1 * y^2 + A'_2 * y^3 + A'_3 * y^4 \qquad (7)$$
$$(0.041 < |y| \leq 0.33)$$

$D'=0.655$
$A'_0=0.2724$
$A'_1=-3.966$
$A'_2=11.62$
$A'_3=-21.57$

Figure 1:
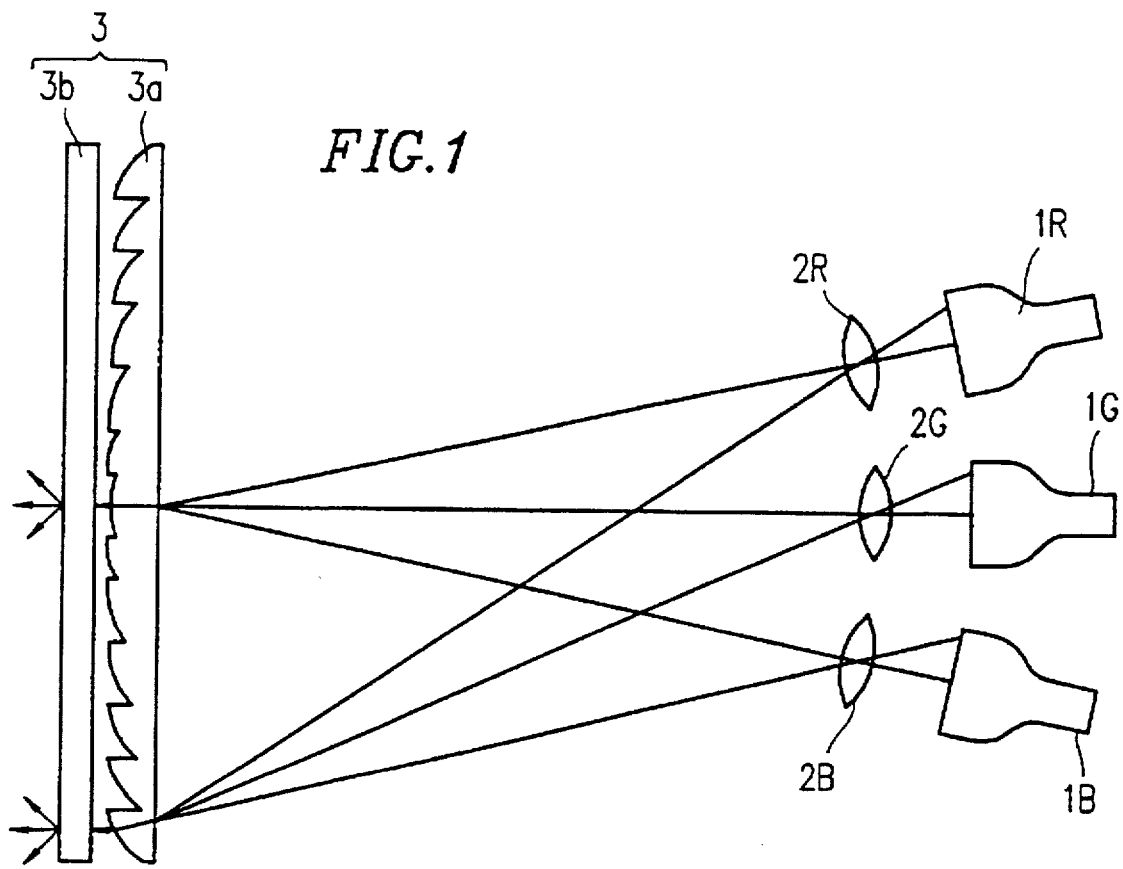
FIG. 1 is a schematic view showing a basic structure for an image projection apparatus of a rear projection type.
Figure 2:
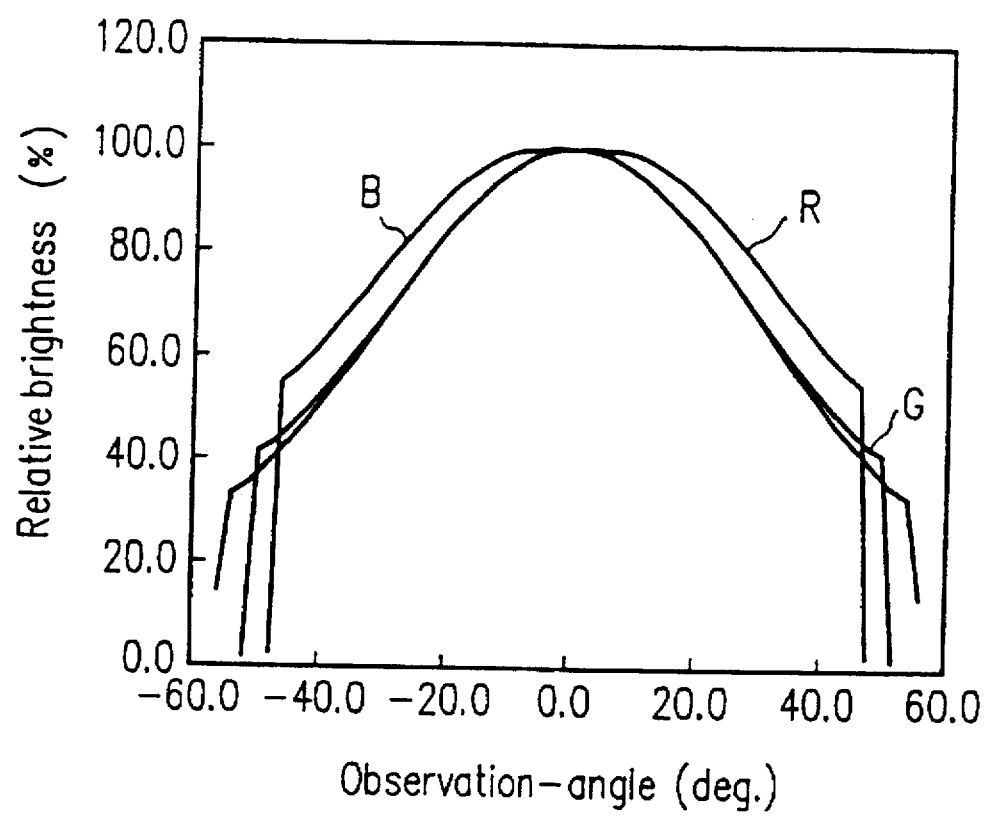
FIG. 2 shows the relationship between the observation angle and the relative brightness in the case where the conventional method is applied to the image projection apparatus with a converging angle of 7°.
Figure 10:
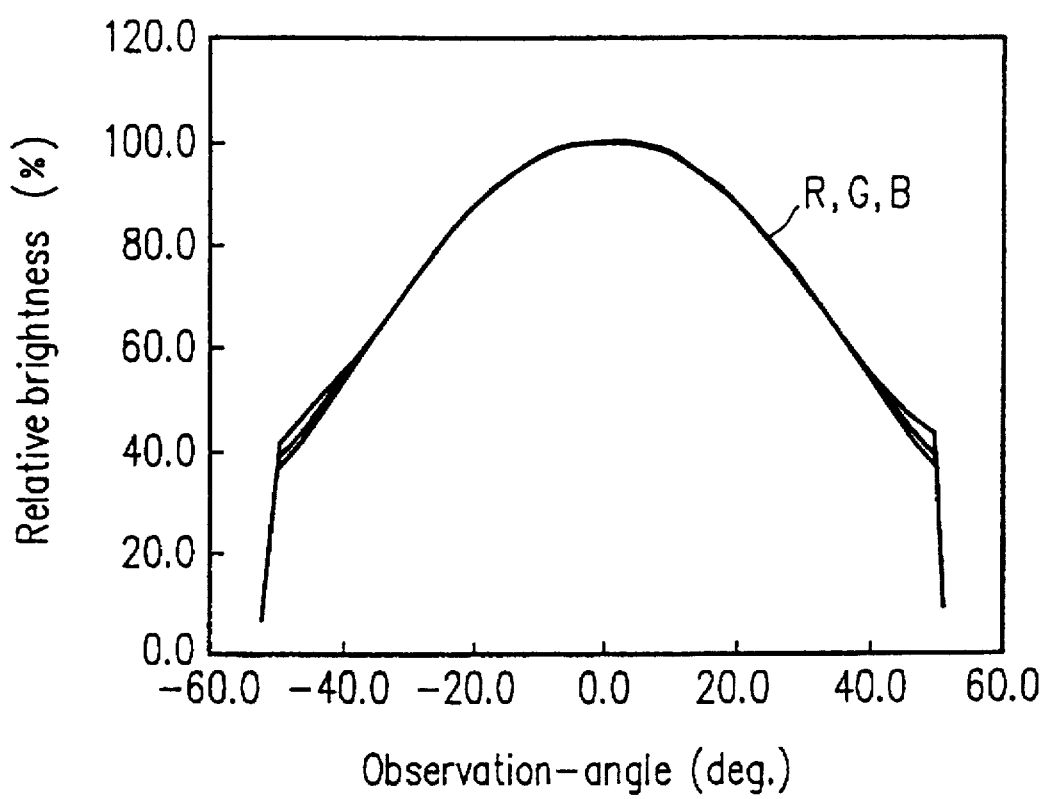
FIG. 10 is a graph showing the relationship between the observation angle and the relative brightness in the case where the present invention is applied to the image projection apparatus with a converging angle of 7°.

FIG. 10 shows the relative brightness which varies depending upon the observation angle, in this modified example. It is understood from FIG. 10 that a color shift, which slightly remains in FIG. 2 showing the case of the conventional apparatus when the converging angle is 7°, is substantially completely eliminated.

As is apparent from the above description, according to the present invention, even in the case where the converging angle is large, the light beams incident in parallel with the optical axial plane and the light beams incident obliquely to the optical axial plane with the same light beam height as that of the light beams incident in parallel with the optical axial plane can be output at a substantially equal outgoing angle with respect to both the upper light beams and the lower light beams. Because of this, a color shift can be sufficiently eliminated even in the case where the converging angle is large. As a result, optical characteristics sufficient for practical use can be secured. Thus, the present invention is very effective in terms of the realization of a thin image projection apparatus.

Furthermore, in the case where the converging angle is relatively small, a color shift cannot be eliminated by using the conventional method to a degree sufficient for practical use. However, according to the present invention, a color shift can be substantially completely eliminated. Thus, the optical performance of the image projection apparatus can be improved.

Various other modifications will be apparent to and can be readily made by those skilled in the art without departing from the scope end spirit of this invention. Accordingly, it is not intended that the scope of the claims appended hereto be limited to the description as set forth herein, but rather that the claims be broadly construed.

What is claimed:

1. An image projection apparatus of a rear projection type including a display portion having three image sources respectively displaying red, green, and blue images, a screen portion on which the red, green, and blue images are projected, and a projection member positioned between the display portion and the screen portion, the screen portion comprising:

an optical member for converting a plurality of light beams output from the display portion into a plurality of substantially collimated light beams; and a rear face and a from face, wherein the rear face is positioned between the front face and the optical member, the rear face and the front face respectively having an array of cylindrical lenses, an optical axial plane of each of the cylindrical lenses on the front face substantially coinciding with an optical axial plane of a corresponding cylindrical lens on the rear face, and wherein each of the cylindrical lenses on the front face transmits, at a first angle, a first light beam which was incident on the corresponding cylindrical lens on the rear face obliquely to the optical axial plane, and transmits, at a second angle, a second light beam which was incident on the corresponding cylindrical lens on the rear face parallel to the optical axial plane at an identical incident height with an incident height of the first light beam, the first angle and the second angle are substantially equal to each other regardless of which side of the optical axial plane of the corresponding cylindrical lens on the rear face the first and second light beams were incident on.

2. An image projection apparatus according to claim 1, wherein each of the cylindrical lenses on the rear face has spherical aberration.

3. An image projection apparatus according to claim 2, wherein a profile of each of the cylindrical lenses on the rear face is represented by the Formula:

$$x=-(1-y^2/b^2)^{1/2}+c*y^2$$

where an x-axis is the optical axial plane and a y-axis is a sectional face when each of the cylindrical lenses on the rear face is cut to the optical axial plane and perpendicular to an extended direction of the cylindrical lenses on the rear face.

4. An image projection apparatus according to claim 1, wherein each of the cylindrical lenses on the rear face has spherical aberration in which an outermost off-axis focal length of a light beam incident on the rear face is larger than a paraxial focal length of the light beam incident on the rear face, and a distance between the front face and the rear face is larger than the paraxial focal length.

5. An image projection apparatus according to claim 3, wherein the distance is smaller than the off-axis focal length.

6. An image projection apparatus according to claim 1, wherein each of the image sources is a CRT.

7. An image projection apparatus according to claim 1, wherein each of the image sources is a liquid crystal display device.

8. A projection screen comprising:

an optical member for converting a plurality of light beams into substantially collimated light beams; and a rear face and a front face, wherein the rear face is positioned between the front face and the optical member, the rear face and the front face respectively having an array of cylindrical lenses, an optical axial plane of each of the cylindrical lenses on the front face substantially coinciding with an optical axial plane of a corresponding cylindrical lens on the rear face, and wherein each of the cylindrical lenses on the front face transmits, at a first angle, a first light beam which was incident on the corresponding cylindrical lens on the rear face obliquely to the optical axial plane, and transmits, at a second angle, a second light beam which was incident on the corresponding cylindrical lens on the rear face parallel to the optical axial plane an identical incident height with an incident height of the first light beam, the first angle and the second angle are substantially equal to each other regardless of which side of the optical axial plane of the corresponding cylindrical lens on the rear face the first and second light beams were incident on.

9. A projection screen according to claim 8, wherein each of the cylindrical lenses on the rear face has spherical aberration.

10. A projection screen according to claim 9, wherein a profile of each of the cylindrical lenses on the rear face is represented by the Formula:

$$x=(1-y^2/b^2)^{1/2}+c*y^2$$

where an x-axis is the optical axial plane and a y-axis is a sectional face when each of the cylindrical lenses on the rear face is cut to the optical axial plane and perpendicular to an extended direction of each of the cylindrical lenses on the rear face.

11. A projection screen according to claim 8, wherein each of the cylindrical lenses on the rear face has spherical aberration in which an outermost off-axis focal length of a light beam incident on the rear face is larger than a paraxial focal length of the light beam incident on the rear face, and a distance between the front face and the rear face is larger than the paraxial focal length.

12. A projection screen according to claim 11, wherein the distance is smaller than the off-axis focal length.

13. A projection screen according to claim 8, wherein the plurality of light beams contain red light beams, green light beams, and blue light beams.

14. A projection screen according to claim 13, wherein a convergence angle between the incident green light beams and the corresponding red light beams or the blue light beams is about 15°.

* * * * *

UNITED STATES PATENT AND TRADE MARK OFFICE
CERTIFICATE OF CORRECTION

PATENT NO. : 5,675,434
DATED : October 7, 1997
INVENTOR(S) : Hiroshi Yamaguchi

It is certified that error appears in the above-identified patent and that said Letters Patent is hereby corrected as shown below:

In Col. 1, line 34, delete "end" and insert therefor --and--.

In Col. 6, line 2, delete "an the case" and insert therefor --in the case--.

In Col. 6, line 24, delete "difference an conditions" and insert therefor --difference in conditions--.

In Col. 7, line 17, delete "y the procedure" and insert therefor --by the procedure--.

In Col. 8, line 38, delete "are (first beam) represented" and insert therefor --(first beam) are represented --.

In Col. 9, line 15, Formula (5) should read: -- $x = -(1-y^2/b^2)^{1/2} + C' * y^2$ --.

In Col. 10, Claim 1, line 23, delete "a from face" and insert therefor --a front face--.

In Col. 10, Claim 3, line 55, between "cut" and "to" insert --perpendicular--.

In Col. 12, Claim 10, line 9, between "cut" and "to" insert --perpendicular--.

Signed and Sealed this

Third Day of March, 1998

BRUCE LEHMAN

*Attest:*

*Attesting Officer*  Commissioner of Patents and Trademarks